United States Patent [19]
LaBerge

[11] 3,748,754
[45] July 31, 1973

[54] METHOD AND APPARATUS FOR SIMULTANEOUSLY TEACHING AND TESTING A STUDENT

[76] Inventor: David L. LaBerge, 2410 Sherwood Hills Rd., Minnetonka, Minn. 55343

[22] Filed: Dec. 13, 1971

[21] Appl. No.: 207,200

Related U.S. Application Data

[63] Continuation-in-part of Ser. No. 46,182, June 15, 1970, abandoned.

[52] U.S. Cl. .................................. 35/48 R, 35/35 B
[51] Int. Cl. ........................................... G09b 17/04
[58] Field of Search ....................... 35/9 R, 9 A, 9 B, 35/6, 48, 35 B

[56] References Cited
UNITED STATES PATENTS

| | | | |
|---|---|---|---|
| 3,675,339 | 7/1972 | LaMarca | 35/6 |
| 3,577,657 | 5/1971 | Plumly et al. | 35/9 A |
| 3,605,286 | 9/1971 | Plumly | 35/9 A |
| 3,605,289 | 9/1971 | Plumley et al. | 35/9 A |
| 3,606,688 | 9/1971 | Zawels et al. | 35/9 R |

Primary Examiner—Robert W. Michell
Assistant Examiner—J. H. Wolff
Attorney—Robert T. Edell et al.

[57] ABSTRACT

This invention is a machine and a method of machine operation for teaching and testing identification and comprehension of stimulus patterns and to improve the speed of doing same by providing a repeated presentation of target symbols, corresponding to an initial cue symbol, to which the student is expected to respond positively, and occasional catch symbols to which the student is to make no response, and thereafter providing an immediate readout indicating the performance on a test run for the student and instructor. The system measures performance in terms of the average response time for correct responses and the number of correct responses as well as the number of incorrect responses. The immediate readout of student performance is provided so that particular learning difficulties may be identified at once and allow the student to correct his particular problem, thereby optimizing his learning rate. The subject's performance on new material is compared against his performance on well-learned material over a period of practice to indicate progress made.

12 Claims, 4 Drawing Figures

METHOD AND APPARATUS FOR SIMULTANEOUSLY TEACHING AND TESTING A STUDENT

This application is a continuation-in-part of U.S. Pat. application Ser. No. 46,182, filed June 15, 1970, now abandoned.

Teaching machine techniques are designed to place the student under intensive learning pressure for a relatively brief period of time and at repeated intervals. For the student to obtain the best results during one of the intensive training periods during which he is using a teaching machine, the student must obtain feedback information rapidly from the machine.

A technique of program teaching has been much discussed, wherein the student is given reinforced training in a problem in mathematics or physics, for example, by giving yes or no responses to stated questions and receiving feedback from the machine. If his answer is wrong, the same material is repeated in a different form; or, he goes on to new material if his answer to the previous material is correct. This system is a textbook substitute and does not provide the intensive learning experience required to bring perception and comprehension of the material up to a level where the process begins to be automatic.

In reading, as an example, although the principles of mathematics, physics, and other studies may be similarly adapted for use with my machine, there are two learning abilities which are recognized as being fundamental. The first ability is that of identifying a letter or a word which is presented, a process often called decoding. The decoding process distinguishes a symbol from all other symbols. For example, the decoding of the word "hat" requires that it be distinguished from "hot" or "had." The second ability is that of assigning a meaning to the decoded symbol. For example, the word "hat" calls up the image or thought of "something worn on the head." This process of assigning a meaning to the decoded symbol is often referred to as comprehension.

A student must be able to do more than simply identify and comprehend a symbol correctly. He must be able to do these things rapidly and automatically. If a student's rate of comprehension of phrases and symbols is high, then higher cognitive interpretations of what is read can be carried out relatively independently of the basic decoding and comprehending operations.

One way to devote less attention space to decoding operations is to learn to take in larger and larger groups of words in a single mental step. This means that the student should not look at letters or even individual words, but rather grasp a group of words as an entirety. The procedure here described not only teaches correct identification and comprehension of stimulus patterns, but puts great emphasis on training the person to do these operations more and more rapidly until the operations become automatic. When decoding material becomes automatic, a person can devote full mental attention to what is being read.

A description of cueing and response techniques is given in an article entitled "A cueing technique in choice reaction time" by David LaBerge, Peter Van Gelder and John Yellott, Jr., published in Perception & Psychophysics, 1970, Vol. 7 (1)

My invention allows an instructor and, with proper explanation, a student to distinguish the source of a learning difficulty as being either improper decoding or improper comprehension of that which is decoded. If the problem is one of decoding, the student is not allowing himself enough time to examine the material, and if the problem is comprehension, the student must, after having decoded the material, allow himself greater reflection before making a decision. In other words, the machine can determine if a student is responding by guessing or is giving a proper amount of attention to the problem symbol presented by the machine. What's more, the instructor or student can determine how automatic the decoding and/or comprehension has become, by comparing response speed to new material with that of older, well-known material.

One problem with an intensive teaching process, however, is that too often operation of the teaching machine itself requires too substantial a portion of the student's mental facilities, and consequently, the difficulties of operating a machine interfere with the testing technique. The present invention, in contrast to most programmed devices, requires an absolute minimum of attention to machine operation on the part of the student. Thus, an ideal facility is provided for the student to improve his specific skills.

My invention is a machine and method of machine operation which presents to the student or subject a programmed presentation, audio or visual. Before the student sees or hears a pattern to be decoded or comprehended, he is given a cue symbol. This cue tells him what symbol requires a response. The student ideally responds positively only to target symbols which are identical or related to the cue symbol and makes no response to nontarget or catch symbols.

Simultaneously, with the presentation of a particular symbol, a timing system commences operation. If the student gives a correct response, that is, if the presented symbol is a target symbol, the timing system will record the reaction time between the start of the presentation and the student's response and will actuate a "correct" counter. If the student responds to a nontarget or catch symbol, an "error" counter is actuated.

At the end of a sequence, the student is given a readout of his average correct response time and number of correct responses, as well as the number of incorrect responses. The average time involved in giving an erroneous response is not considered sufficiently significant for the measurement of the student's performance in this procedure. The ability of this system to give an immediate output indication or readout to the student and instructor at the end of each individual sequence, where a number of sequences will be involved in an intensive training session, is a significant feature of my invention. In addition, since the student is required only to actuate a single response switch in the "yes" mode when a target item is presented for identification, there is minimum distraction of the student's attention away from the learning process to the intricacies of the operation of the machine. Thus, the learning processes of the student are analyzed rather than his ability to master the machine. This feature renders my invention very appropriate for use with young students or students who have had relatively little experience with machines of any type.

The method which I employ involves a sequence of test items which are presented to the student, each of which is immediately preceded by a cue symbol. Thus, one or more items may be used in a single sequence of tests to improve the student's abilities. The sequence may be presented, for example, at regular time intervals to establish a rhythmic thought pattern for the student. For example, a sequence may be developed to improve the subject's abilities with an "A" and a "B" item simultaneously. In this case, the symbol "A" is presented to the student as a first cue symbol and immediately followed by the symbol to be decoded and comprehended. The cue symbol may be the "A" item several times in succession or alternate frequently with a second cue or "B" symbol. The correct count and incorrect count is maintained separately for the "A" cue symbol and for the "B" cue symbol, as well as the average response time during the test sequences for the "A" and "B" cue symbols. Thus, the student's ability may be tested on a comparatively easy symbol at essentially the same time as his ability with a difficult symbol is being tested. Thus, during a two or three minute period of time, a subject's mental capacity of fitness is not likely to change and an accurate comparison may be made of the student's ability with the easy item as compared to the hard item, or between familiar material and non-familiar more difficult material. The cue symbol is properly identified as a cue, such as by the use of an appropriate indicator, so that the student does not become confused. It is the presentation of the cue symbol before each and every test which makes my invention a useful tool in evaluating a subject's abilities.

Accordingly, a general object of my invention is the provision of a machine and a method of machine operation whereby the ability of a student to decode and comprehend symbols is improved through the use of a presentation of programmed material, wherein a sequence of items is presented, and each item is preceded by a cue symbol to stimulate and prepare the student for the trial to follow.

A further object of my invention is a machine and a method of machine operation whereby a student undergoes an intensive training session through the use of programmed material in which the student's learning ability is analyzed with respect to past performance, and wherein the learning ability of the student may be analyzed with respect to decoding ability and comprehension ability independently.

These and other objects and advantages of this invention will be apparent from the following description made in connection with the accompanying drawing, in which:

Figure 1:
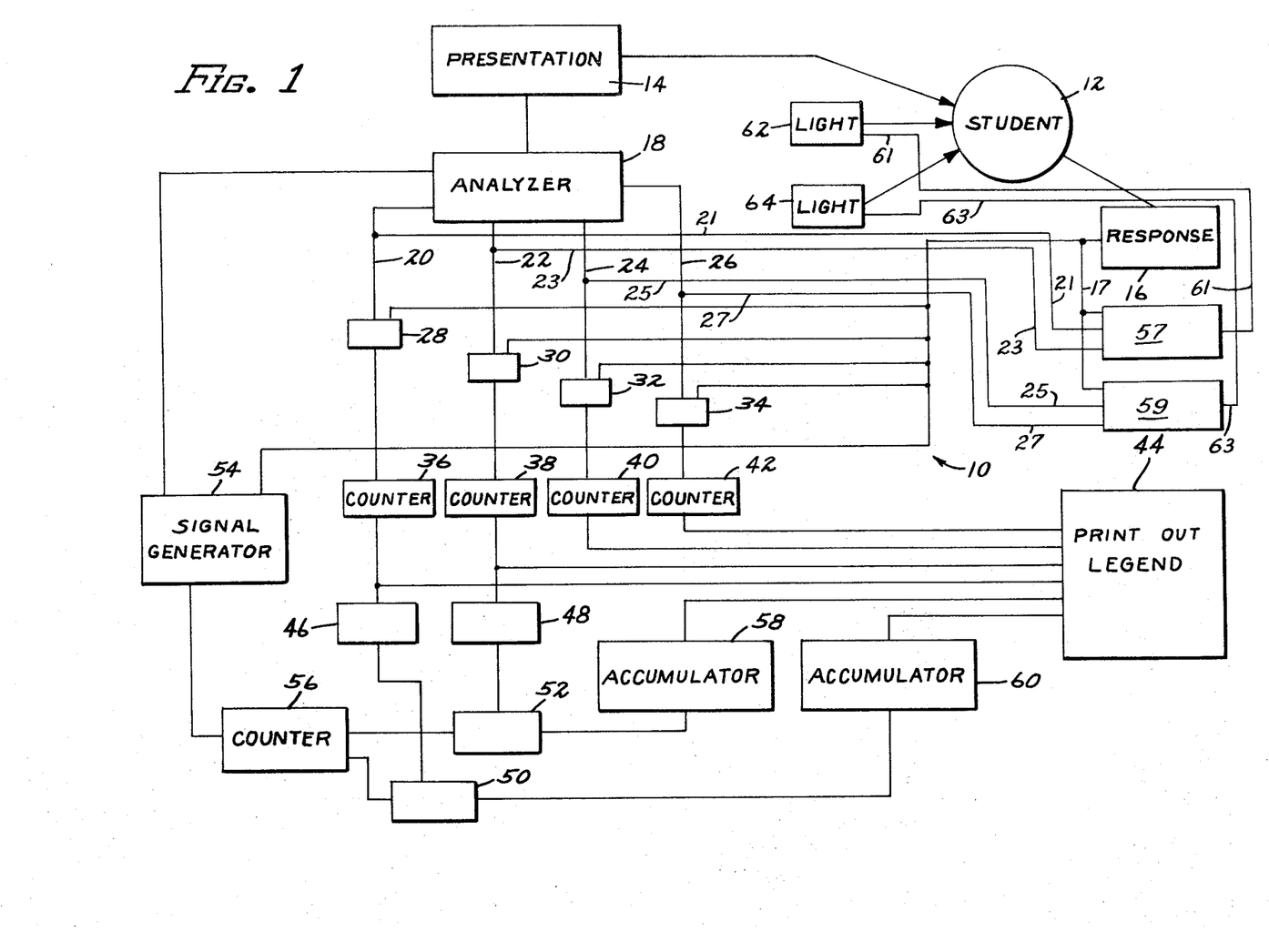
FIG. 1 is a block diagram of the teaching machine, according to my invention.

Reference numeral 10 generally designates the entirety of the learning ability improvement and testing machine, according to my invention. A student using the machine is schematically represented and designated by reference numeral 12. The student receives a presentation of items of the instructional program from the PRESENTATION source designated 14. For generality, the presentation may be audio, visual, or a combination thereof, and could even include tactile input as well. In response to the stimuli which the student receives from the presentation source, he operates a RESPONSE mechanism 16 which will consist of a single pole switch which the student closes at the appropriate time, as indicated by the instructional material presented. The presentation source contains a program consisting of a sequence of cue and trial symbols prepared by an instructor in advance. The presentation of items may consist of a plurality of slides on a screen by a slide projector or it may consist of a televised presentation prerecorded on magnetic tape.

In the form of my invention disclosed herein, the program sequence consists of pairs of items presented successively. The first item of the pair is a cue symbol which may be, for example, a word or group of words. This prepares the student to expect an identical or related symbol to follow as the second item of the pair. When the second item of the pair is presented, the student responds only if the expected target is presented, and does not respond if a nontarget or catch is presented. The sequence of presentation continues in a prearranged manner using different cue items in random order so that the student's performance with different paired items may be determined.

From the PRESENTATION system 14, a connection is made to an ANALYZER system 18. The analyzer determines from information contained in the programmed material, what particular target or catch symbol is being presented to the student.

In the embodiment of my invention, herein described, provision is made for the use of two cue symbols within the same practice series. It would be obvious with the present description to further adapt my invention for use with several cue symbols simultaneously. The student is instructed to respond positively to the target symbol that is identical to or related to the immediately preceding cue symbol. A "difficult" cue symbol, such as the word "airplane," may be combined in a series with an "easy" word like "dog" for a young student. The student's speed of responding to the "easy" word is compared to that of the "difficult" word, as a means of measuring progress in developing ability with the "difficult" word.

Shown below is a representative program for the teaching machine of the present invention.

| SLIDE NO. | TYPE OF SLIDE | PARTICULAR INFORMATION SHOWN |
|---|---|---|
| 1 | Instruction | Instruction on Operation of Machine |
| 2 | CUE A | j |
| 3 | TARGET A | j |
| 4 | CUE A | j |
| 5 | CATCH A | g |
| 6 | CUE A | j |
| 7 | TARGET A | j |
| 8 | CUE A | j |
| 9 | TARGET A | j |
| 10 | CUE B | hat |
| 11 | TARGET B | hat |
| 12 | CUE B | hat |
| 13 | TARGET B | hat |
| 14 | CUE A | j |
| 15 | CATCH A | y |
| 16 | CUE B | hat |
| 17 | TARGET B | hat |
| 18 | CUE B | hat |
| 19 | CATCH B | hot |
| 20 | CUE B | hat |
| 21 | CATCH B | had |
| 22 | CUE A | j |
| 23 | TARGET A | ddd |
| 24 | CUE A | j |
| 25 | CATCH A | ddb |
| 26 | STOP | |

As can be seen by referring to the example, a CUE A can be followed either by a TARGET A of the same symbol or by a CATCH A of a different symbol. Similarly, a CUE B can be followed by a TARGET B or a CATCH B. Furthermore, if suitable explanation is given to a student in advance, a CUE A, or a CUE B may be followed by a series of dissimilar symbols, in which case the correct response may depend on whether or not the following symbols are all the same or one or more different. For example, in Slide 22 of the example, the CUE is the letter "*j*," while in Slide 23, the slide shows "*ddd*." This TARGET would be a correct response because all three of the letters are the same. On the other hand, Slide 24, CUE A, shows a "*j*" CUE while Slide 25 is a CATCH response since the letters are "*ddb*" which are not all the same and, therefore, an incorrect response. As is readily apparent the teacher, or instructor, can set the program for the machine in any manner desired.

Depending on whether TARGET symbol "A" or "B" or a CATCH symbol for "A" or "B" is presented, an output is directed through one of the outputs, 20, 22, 24, or 26, from the ANALYZER 18. The outputs from the analyzer are connected to logic elements well known in the electronic art as AND gates 28, 30, 32 and 34. Each of the AND gates 28, 30, 32 and 34, has as its other input a connection to the response indicator operated by the student. Thus, the analyzer determines at once what the presentation to the student is, and some time later, if a response is made, the machine will register the combined information of presentation plus response in COUNTERS 36, 38, 40 and 42. Thus, an output from any of the AND gates indicates that a particular piece of programmed material has been presented to the student and that the student has, after a time delay, caused by normal human information processing time, responded.

The number of responses to particular symbols in material presented are recorded on COUNTERS 36, 38, 40 and 42. Responses to "A" and "B" target symbols are recorded on COUNTERS 36 and 38 respectively. Erroneous responses are counted by COUNTERS 40 and 42 for "A" and "B" cues respectively. The outputs from the COUNTERS 36, 38, 40 and 42 are connected to an output system 44 which displays the results of the student's performance in response to the presentation of material. In addition, COUNTERS 36 and 38, which are used to count correct responses to target symbols "A" and "B" respectively, are in addition, connected to SUMMATION devices 46 and 48. The SUMMATION devices 46 and 48 have the characteristic that they will emit an output signal when the number of input signals is equal to or less than a predetermined number selected for ease of computation in determining the student's average response time. It is contemplated in this embodiment of my invention that the use of the number ten will be convenient, as will be explained further. When the student has made ten or more correct responses, for example, this is still recorded on the output PRINTER 44, but the further responses above ten are not used in the further operation of the time averaging system, as will be explained. This is accomplished by the change in output signals of the SUMMATION devices 46 and 48 shutting off the transfer systems, 50 and 52 respectively, as the count of 10 is reached. The operation of these transfer systems will be more fully described below.

A SIGNAL GENERATOR the "is connected to the ANALYZER 18 and to the flip-flop s RESPONSE system 16 and is controlled thereby. When the ANALYZER 18 transmits a signal through a connection to the SIGNAL GENERATOR, it begins to generate an oscillatory signal. The COUNTER 56 counts the number of cycles which are generated in the reaction time interval. Then, at a later time, determined by the student's processing time for the presentation material, and if appropriate, the response mechanism is operated and the SIGNAL GENERATOR 54 turned off, then the counter has determined the number of cycles of operation of the pulse generator which have operated during the student's reaction time to a target symbol. If a catch symbol is presented, the analyzer does not turn the signal generator on and no count is made.

When the counter has counted the number of cycles, or in other words, timed the student's reaction time to a particular presentation of the "A" or "B" target symbol, the count is transferred through the TRANSFER system 50 or 52 respectively, as long as it has not been deactivated by an input from SUMMATION devices 46 or 48 respectively. If the response has been an erroneous response and COUNTERS 40 or 42 are activated rather than COUNTERS 36 or 38, then, of course, neither of the TRANSFER systems 50 or 52 are activated. The TRANSFER systems 50 and 52 transfer the count from the COUNTER 56 and adds it to an ACCUMULATOR 58 or 60, which stores successive counts for the series of timed reactions to the presentation material. As previously explained, the SUMMATION devices 46 and 48 block the transfer of the cumulative count whenever ten correct responses have already been received. This is because the program is designed to present to the student a few extra items to which he should respond, and the count record is retained to determine if the student has responded to all the items, but only the first ten items after the practice items are used in determining the response time. The practice items are controlled by the program, and the analyzer does not activate any of the AND gates. Using the first 10 items, after the practice items, to determine the student's average reaction or response time is easy in that the average is already computed merely by automatically dividing the cumulative response time to the ten events by ten, or in other words, merely printing out the cumulative response time with the decimal place automatically moved one place to give the average response time.

LIGHT 62 is connected to the input path of COUNTERS 36 and 38 and also to the response mechanism 16 and is lit momentarily when the student has made a correct response, so that the student will immediately know that he has made a correct response, and similarly, LIGHT 64 is connected to the input path of COUNTERS 40 and 42 and also to the response mechanism 16 so that the student will immediately know if he has made an incorrect response to the presentation material. This will allow the student to immediately improve his performance during a test run, by allowing himself a little more time to examine the presentation material if he feels that he is making errors by responding too fast, and guessing.

More particularly, a light drive unit 57 is connected by means of lines 21 and 23 to the outputs 20 and 22, respectively, of analyzer 18. The output of light drive unit 57 is connected by means of a conductor 61 to the light 62. Similarly, a light drive unit 59 is connected by means of conductors 25 and 27 to the outputs 24 and 26 of analyzer 18, while the output of light drive 59 is connected by means of conductor 63 to the light 64. The response mechanism 16 is connected by means of conductor 17 to the light drive units 57 and 59, respectively.

In operation, the system I have devised would require the preparation of a program of sequential material by an instructor which would be placed in the PRESENTATION system 14, of my invention. The presentation would be designed to present effectively, according to the knowledge available to the instructor, successive pairs of items consisting of a cue symbol or symbols and a target or catch presentation to which the student is expected to give his attention. The cue items will always be symbols of the "A" or "B" variety; the following presentation will be target symbols of the "A" or "B" type, or catch symbols of any sort. One or two trials are presented at the beginning of the sequence so that the student may familiarize himself with the task, and then the test portion of the sequence commences. COUNTERS 36, 38, 40 and 42 count the student's responses to target symbols of the "A" and "B" variety and various catch symbols, and at the end of the sequence, the recorded sum of responses of each type is presented as an output of the machine. In addition, the student's average response time to target symbols of the "A" and "B" variety, respectively, is determined and presented at the output of the machine at the end of the test sequence. The instructor analyzes the output using a number of criteria. For example, if the average response time is too short, the student may be guessing at his answers and thereby increase the number of errors he makes. If the student's response time is too long, he may be daydreaming and not paying attention to the presentation. A student's ability to decode presented materials is tested by the student's being required to respond positively to target items identical to the cue symbol. A student's comprehension ability may be tested by the student's being required to respond positively to pictures or word synonyms when a cue word is used. The system may be used to measure decoding and comprehension ability simultaneously. The "A" items may be identical to the "A" cue symbol and the "B" items may require mental correlation of a synonym to the "B" cue symbol. In operation, my invention will present the visual item following the cue for a predetermined period of time, if there is no response by the student, but a response will cause the symbol to vanish immediately. The procedure which allows my invention to make accurate time measurements is the presentation of a cue item, so that the student always expects a particular word or phrase or picture to occur as a target. In this way, his reaction time measure is much more reliable than if he is not prepared for the specific target item, becuase the student's attention is always set in the same fashion as the test item is presented.

There are several ways that my invention can improve comprehension, and teachers may choose the method they prefer to use. In one method, the word is presented as the cue and a picture is flashed as the target. For example, the word "airplane" appears as a cue, and the person presses a button if a picture of an airplane appears, but he does not respond to any other object which may appear. A second method reverses the order of presentation, and a picture becomes the cue, and the word the target. A third method combines both of these procedures by presenting word and picture simultaneously. If they match, the person presses a button; if they do not match, he does not respond. Practice with word-picture pairs will speed the process by which a perceived word or phrase calls out the appropriate meaning denoted by the word or phrase. In other words, the person can understand more quickly what his vision has just decoded. Comprehension tasks such as the one just described can be scattered among the decoding tasks in any manner that a particular reading program prescribes.

Training of word-sound connections can be given by various methods with this system. To check a student's comprehension of spoken words, we can present the audio form with the visual word and have the person press the button if the items match. For another example, the phono-visual method of teaching sounds of letters requires that the person find the letter which goes with a sound that a teacher makes, or finds the sound which goes with letters that the teacher presents. A picture of a familiar object (e.g., a banana) appears first as the cue. The earphones then deliver the sound of the first phoneme, "ba" and the word "banana" appears visually. The child presses the button when the sound "ba" matches the first letter of the word he sees. For any other sound or any visual word beginning with some other consonant, he must not respond. His progress is, as before, measured as he practices.

The description of methods used for diagnosing and training comprehension and sight-sound recognition illustrate the flexibility of the system. Other methods are expected to be developed with the existing system as research in reading progresses in our laboratory and other laboratories across the nation.

An advantage of this machine includes the fact that an analysis of the student's learning ability is available immediately following the student's test run with a sequence of material. Those words that the student is slowest in identifying should get more training trials than the ones he can very quickly perceive. The printed record of a child's work on one day can be evaluated immediately by the teacher so that he can be given practice the next day on exactly what he needs to learn at this stage of his training.

An outstanding feature of the system is its capability to measure a student's decoding speed apart from his speed of comprehension. Thus, a slow reader's problem may be diagnosed as being one of either comprehension or decoding, and then, further practice segments may be used to improve the student's learning ability in the problem area. Since the student is required to respond only to the target items, his response action is simplified. This is a significant advantage because this simple response effort on the part of the student permits him to concentrate more completely on the subject matter being presented. This produces extremely accurate analysis of both the student's decoding ability and his ability to comprehend.

Also, the system represents a positive approach to learning in that the student may sit passively when a catch symbol is presented. This allows a discrimination between target and catch items which lies in favor of the target items for the student's learning process.

By requiring positive action for each target item presented and requiring no action at all as the proper response to a nontarget item, the "correct" item (or answer) is impressed upon the student's mind and the nontarget or "incorrect" item will not be impressed on his mind, thus facilitating remembering the correct item rather than the incorrect item and greatly facilitating the student's learning process.

A fundamental part of my invention is the presentation of the cue symbol or symbols before each individual test item so that the person always expects and can look for particular target symbols. By preparing the student in advance for specific target items, a true measure of the student's learning ability is obtained.

Figure 2A:
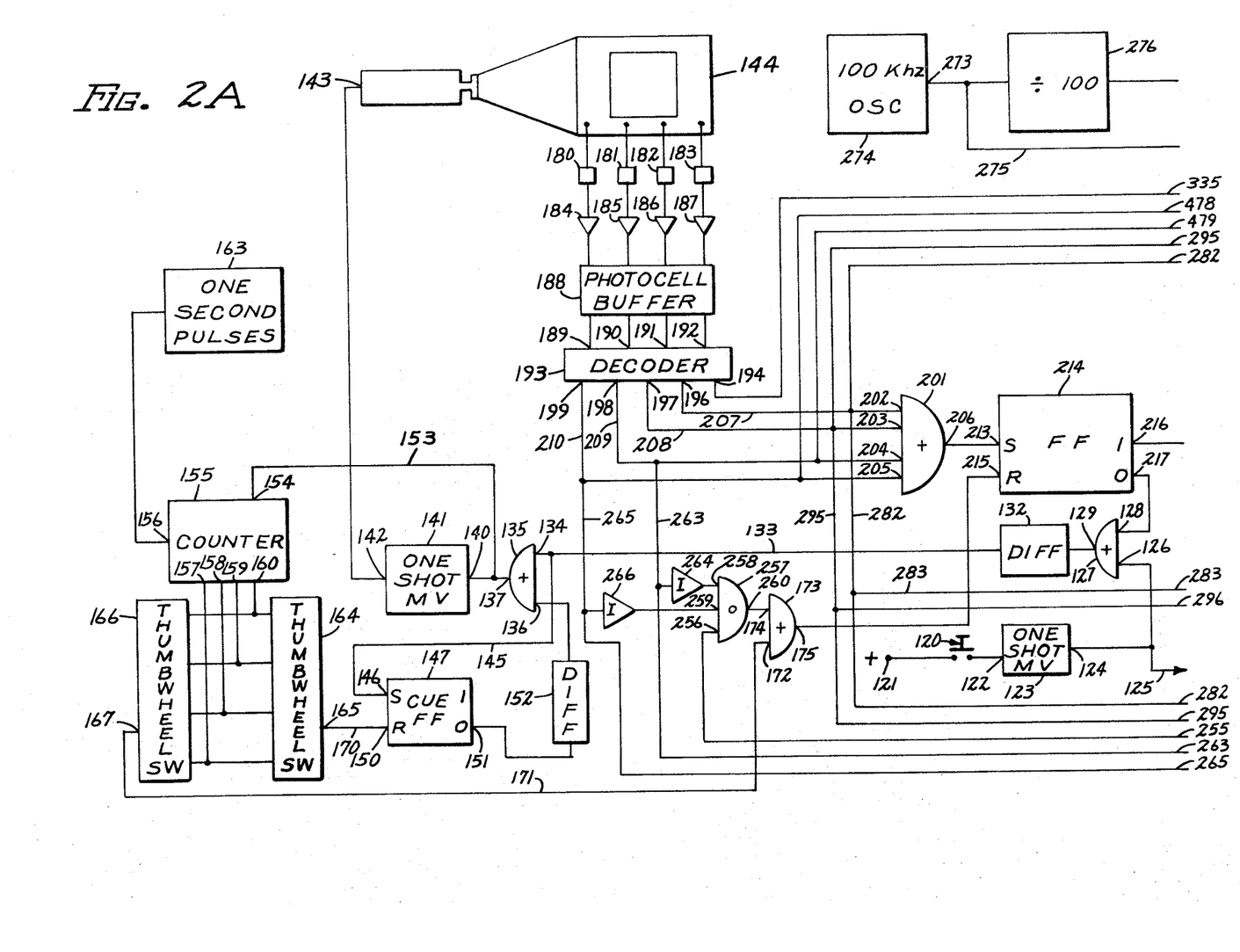
FIGS. 2A, 2B and 2C are a schematic diagram of the present invention.
Figure 2B:
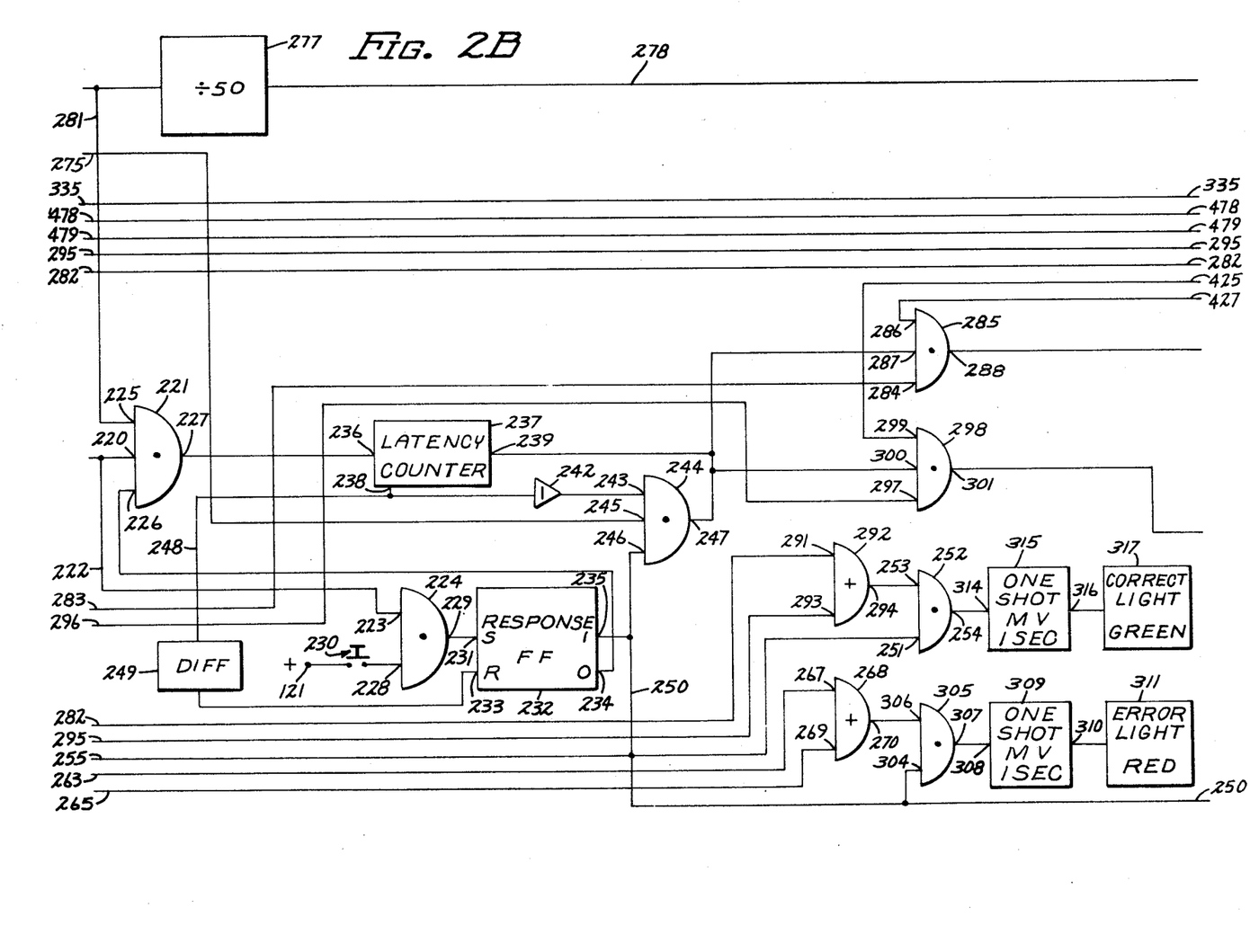
Figure 2C:
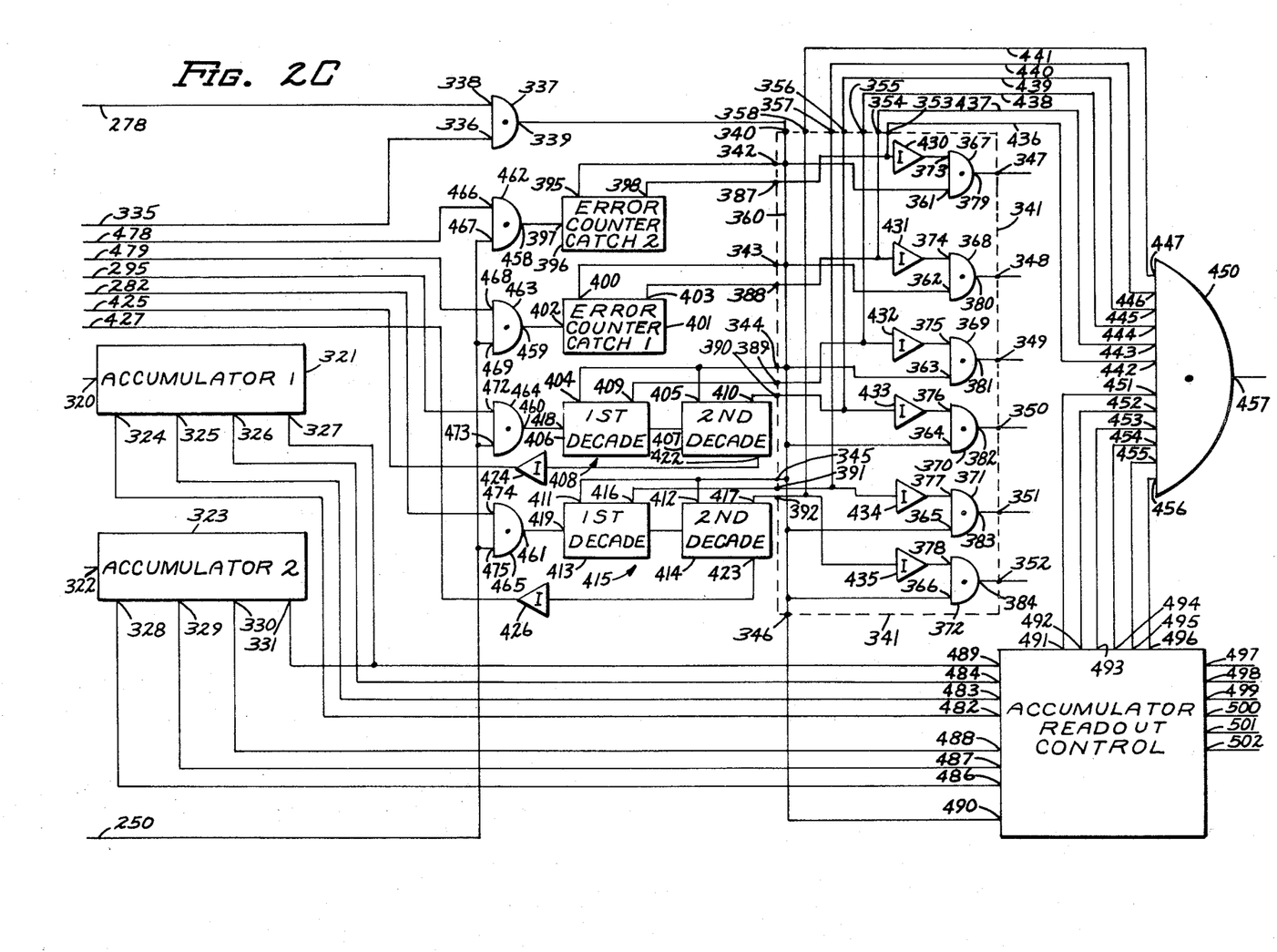

FIGS. 2A, 2B and 2C show a more detailed schematic representation of one possible form of the present invention. Referring to FIGS. 2A, 2B and 2C, there is shown a momentary start switch 120 having one side connected to a source of electrical potential 121 and the other side connected to an input 122 of a one-shot multivibrator 123. One-shot multivibrator 123 further has an output 124 which is connected to a master re-set line 125 and to an input 126 of an OR gate 127. OR gate 127 further has an input 128 and output 129. Output 129 of OR gate 127 is connected by means of a differentiator 132 and a conductor 133 to an input 134 of an OR gate 135. OR gate 135 further has an input 136 and an output 137. Output 137 of OR gate 135 is connected to an input 140 of a one-shot multivibrator 141. One-shot multivibrator 141 further has output 142 which is connected to the advance projector input 143 of a slide projector shown at 144.

Conductor 133 is connected by means of a conductor 145 to a SET input 146 of a CUE flip-flop 147. CUE flip-flop 147 also has a RESET 150 and a "0" output 151. Output 151 of flip-flop 147 is connected by means of a differentiator 152 to the input 136 of OR gate 135.

Output 137 of OR gate 135 is further connected by means of a conductor 153 to a RESET input 156 of a COUNTER 155. COUNTER 155 further has an input 156 and COUNTER READ outputs 157, 158, 159 and 160. Input 156 of COUNTER 155 is connected to a source of ONE SECOND PULSES 163. The outputs 157, 158, 169, and 160 of COUNTER 155 are respectively connected to inputs of a THUMBWHEEL set comparator 164 having an output 165. In addition, output 157, 158, 159, and 160 of COUNTER 155 are also respectively connected to the inputs of a THUMBWHEEL set comparator 166 having an output 167. Output 165 of THUMBWHEEL comparator 164 is connected by means of a conductor 170 to the RESET input 150 of CUE flip-flop 147. Output 167 of THUMBWHEEL comparator 166 is connected by means of a conductor 171 to an input 172 of an OR gate 173. OR gate 173 further has an input 174 and an output 175.

Associated with projector 144 and adapted to be energized by the light from the projector are photocells 180, 181, 182 and 183. The photocells 180 through 183 are respectively connected through amplifiers 184, 185, 186 and 187, and a photocell buffer 188 to the inputs 189, 190, 191 and 192 of a decoder 193. Decoder 193 further has outputs 194, 196, 197, 198 and 199.

An OR gate 201 has inputs 202, 203, 204, 205 and an output 206. Outputs 196, 197, 198 and 199 of decoder 193 are respectively connected by means of conductors 207, 208, 209 and 210 to the inputs 202, 203, 204 and 205 of OR gate 201. Outputs 196 and 197 of decoder 193 are respectively the TARGET 1 output and the TARGET 2 output, while outputs 198 and 199 of decoder 193 are respectively the CATCH 1 output and the CATCH 2 output.

Output 206 of OR gate 201 is connected to a SET input 213 of a flip-flop 214. Flip-flop 214 further has a RESET input 215, a "1" output 216 and a "0" output 217. RESET input 215 of flip-flop 214 is connected to the output 175 of OR gate 173. The "0" output 217 of flip-flop 214 is connected to the input 128 of OR gate 127, while the "1" output 216 of flip-flop 214 is connected to an input 220 of an AND gate 221, and by means of conductor 222 to an input 223 of an AND gate 224. AND gate 221 further has an input 225, an input 226 and an output 227, while AND gate 224 further has an input 228 and an output 229. Input 228 of AND gate 224 is connected through a momentary response switch 230 to the source of energizing potential 121. Output 229 of AND gate 224 is connected to a SET input 231 of a flip-flop 232. Flip-flop 232 further has a RESET input 233, an "0" output 234 and a "1" output 235.

Output 227 of AND gate 221 is connected to an input 236 of a LATENCY COUNTER 237. LATENCY COUNTER 237 further has a "0" output 238 and a COUNTDOWN input 239. The "0" output 238 of LATENCY COUNTER 237 is connected through an inverting amplifier 242 to an input 243 of an AND gate 244. AND gate 244 further has inputs 245, 246 and an output 247. Output 238 of LATENCY COUNTER 237 is further connected by means of a conductor 248 in series with a differentiator 249 to the RESET input 233 of response flip-flop 232. The "0" output 234 of response flip-flop 232 is connected to the input 226 of AND gate 221. The "1" output 235 of flip-flop 232 is connected by means of a conductor 250 to the input 246 of AND gate 244 and to an input 251 of an AND gate 252. AND gate 252 further has an input 253 and an output 254.

Output 235 of response flip-flop 232 is also connected by means of conductor 250 and a conductor 255 to an input 256 of an AND gate 257. AND gate 257 further has an input 258, an input 259 and an output 260.

Output 198 of decoder 193 is connected by means of conductor 209 and a conductor 263 in series with an inverting amplifier 264 to the input 258 of AND gate 257. Similarly, output 199 of decoder 193 is connected by means of conductor 210 and a conductor 265 in series with an inverting amplifier 266 to the input 259 of AND gate 257.

Conductor 263 is further connected to an input 267 of an OR gate 268. OR gate 268 further has an input 269 and an output 270. Conductor 265 is connected to the input 269 of OR gate 268.

An output 273 of a 100 Khz oscillator 274 is connected by means of a conductor 275 to the input 245 of AND gate 244. The output 273 of oscillator 274 is further connected through a divide by 100 network 276 in series with a divide-by-50 network 277 to a 20 hz output line 278. The output of divide by 100 network 276 is connected by means of a conductor 281 to the input 225 of AND gate 221.

Output 196 of decoder 193 is connected by means of conductor 207, a conductor 282, and a conductor 283 to an input 284 of an AND gate 285. AND gate 285 further has an input 286, an input 287 and an output 288. Conductor 282 is further connected to an input 291 of an OR gate 292. OR gate 292 further has an input 293 and an output 294. Output 294 of OR gate 292 is connected to the input 253 of AND gate 252.

Output 197 of decoder 193 is connected by means of conductor 208, a conductor 295 and a conductor 296 to an input 297 of an AND gate 298. AND gate 298 further has an input 299, an input 300, and an output 301. Output 247 of AND gate 244 is connected to both the input 287 of AND gate 285 and to the input 300 of AND gate 298.

Conductor 295 is connected to the input 293 of OR gate 292.

The "1" output 235 of RESPONSE flip-flop 232 is connected by means of conductor 250 to an input 304 of an AND gate 305. AND gate 305 further has an input 306 which is directly connected to the output 270 of OR gate 268, and an output 307. Output 307 of AND gate 305 is connected to an input 308 of a one shot multivibrator 309. An output 310 of one shot multivibrator 309 is connected to a light 311. Output 254 of AND gate 252 is connected to an input 314 of a one shot multivibrator 315. An output 316 of one shot multivibrator 315 is connected to a light 317.

Output 288 of AND gate 285 is connected to an input 320 of an ACCUMULATOR 321, while output 301 of AND gate 298 is connected to an input 322 of an ACCUMULATOR 323. Both of the ACCUMULATORS 321 and 323 are 5 DECADE ACCUMULATORS, however, upon readout of each of the ACCUMULATORS 321 and 323, only the three most significant decades from each accumulator are read. ACCUMULATOR 321 has READOUT 324, 325, 326 and a COUNTDOWN input 327, while ACCUMULATOR 323 has READOUTS 328, 329, 330 and a COUNTDOWN input 331.

The STOP output 194 of decoder 193 is connected by means of a conductor 335 to an input 336 of an AND gate 337. AND gate 337 further has an input 338 and an output 339. Input 338 of AND gate 337 is connected by means of the conductor 278 to the output of divide by 50 network 277. Output 339 of AND gate 337 is connected to a COUNTDOWN input 340 of a COUNTER READOUT control 341.

COUNTER READOUT control 341 has a plurality of countdown outputs 342, 343, 344, 345, and 346, as well as a plurality of printer set outputs 347, 348, 349, 350, 351 and 352. In addition, COUNTER READOUT control 341 has a plurality of PRINT COMMAND outputs 353, 354, 355, 356, 357 and 358.

COUNTDOWN input 340 of COUNTER READOUT control 341 is connected by means of a conductor 360 to the COUNTDOWN outputs 342, 343, 344, 345 and 346. In addition, COUNTDOWN input 340 is also connected to inputs 361, 362, 363, 364, 365 and 366 of AND gates 367 through 372, respectively. AND gates 367 through 372 further have inputs 373 through 378, respectively, and outputs 379 through 384, respectively. The outputs 379 through 384 of AND gates 367 through 372, respectively, are connected to the PRINTER SET outputs 347 through 352, respectively, of the COUNTER READOUT control 341.

COUNTER READOUT control 341 further has COUNTER ZERO inputs 387, 388, 389, 390, 391 and 392.

Output 342 of COUNTER READOUT control 341 is connected to a COUNTDOWN input 395 of an ERROR COUNTER-CATCH TWO 396. COUNTER 396 further has an input 397 and a ZERO COUNT output 398. Output 398 of COUNTER 396 is connected to input 387 of COUNTER READOUT control 341. Similarly, output 343 of COUNTER READOUT control 341 is connected to a COUNTDOWN input 400 of an ERROR COUNTER-CATCH ONE 401. COUNTER 401 further has an input 402 and a ZERO COUNT output 403. Output 403 of COUNTER 401 is connected to input 388 of COUNTER READOUT control 341.

Output 344 of COUNTER READOUT control 341 is connected to a COUNTDOWN input 404 and a COUNTDOWN input 405 of a first and second DECADE 406 and 407, respectively, of a CORRECT COUNTER-TARGET TWO 408. First DECADE 406 of COUNTER 408 has a ZERO COUNT output 409 which is connected to input 389 of COUNTER READOUT control 341, while 2nd DECADE 407 of COUNTER 408 has a ZERO COUNT output 410 which is connected to input 390 of COUNTER READOUT control 341.

Similarly, output 345 of COUNTER READOUT control 341 is connected to a COUNTDOWN input 411 and a COUNTDOWN input 412 of a 1st DECADE 413 and a 2nd DECADE 414, respectively, of a CORRECT COUNTER-TARGET 1 415. First DECADE 413 of COUNTER 415 further has a ZERO COUNT output 416 which is connected to input 391 of COUNTER READOUT control 341, while 2nd DECADE 414 of COUNTER 415 has a ZERO COUNT output 417 which is connected to input 392 of COUNTER READOUT control 341. COUNTER 408 has a COUNT input 418 while COUNTER 415 has a COUNT input 419. The 2nd DECADE 407 of COUNTER 408 has an output 422 which indicates when the COUNTER in 408 is 11 or higher, while 2nd DECADE 414 COUNTER 415 has an output 423 which indicates when the COUNT in COUNTER 415 is 11 or higher. Output 422 of COUNTER 408 is connected by means of an inverter 424 and a conductor 425 to the input 299 of AND gate 298, while output 423 of COUNTER 415 is connected by means of an inverter 426 and a conductor 427 to the input 286 of AND gate 285.

Inputs 387 through 392 of COUNTER READOUT control 341 are connected through inverter amplifiers 430 through 435, respectively, to inputs 373 through 378 of AND gates 367 through 372, respectively. Inputs 387 through 392 are further directly connected to outputs 353 through 358, respectively, of the COUNTER READOUT control 341. Outputs 353 through 358 of COUNTER READOUT control 341 are connected by means of conductors 436 through 441, respectively, to inputs 442 through 447 of a PRINT COMMAND AND gate 450. PRINT COMMAND AND gate 450 further has inputs 451 through 456, and an output 457.

Inputs 397, 402, 418 and 419 of COUNTERS 396, 401, 408 and 415, respectively, are connected to outputs 458, 459, 460 and 461 of AND gates 462, 463, 464 and 465, respectively.

AND gate 462 further has inputs 466 and 467. AND gate 463 further has inputs 468 and 469. AND gate 464 further has inputs 472 and 473. AND gate 465 further has inputs 474 and 475.

Input 466 of AND gate 462 is connected by means of a conductor 478 and conductor 210 to the CATCH 2 output 199 of decoder 193. Similarly, input 468 of AND gate 463 is connected by means of a conductor 479 and conductor 209 to the CATCH 1 output 198 of decoder 193.

Input 472 of AND gate 464 is connected to conductor 295, while input 474 of AND gate 465 is connected to conductor 282.

Inputs 467, 469, 473 and 475 of AND gates 462 through 465, respectively, are all connected to the RESPONSE conductor 250.

ACCUMULATOR READOUTS 324, 325 and 326 of ACCUMULATOR 321 are connected to inputs 482, 483 and 484 of an ACCUMULATOR READOUT control 485. The circuitry of ACCUMULATOR READOUT control 485 is similar to that shown for COUNTER READOUT control 341, and therefore is not shown in detail. Similarly, ACCUMULATOR READOUT outputs 328, 329 and 330 of ACCUMULATOR 323 are connected to inputs 486, 487 and 488 of ACCUMULATOR READOUT control 485. COUNTDOWN inputs 327 and 331 of ACCUMULATORS 321 and 323, respectively, are connected to a COUNTDOWN output 489 of ACCUMULATOR READOUT control 485. The COUNTDOWN output 346 of COUNTER READOUT control 341 is directly connected to a COUNTDOWN input 490 of ACCUMULATOR READOUT control 485.

ACCUMULATOR READOUT control 485 further has ACCUMULATOR ZERO outputs 491 through 496 which are connected to inputs 451 through 456, respectively, of the PRINT COMMAND AND gate 450. In addition, ACCUMULATOR READOUT control 485 has PRINT output controls 497 through 502 which are connected to the INFORMATION output PRINTER (not shown).

OPERATION

Referring to the drawings, operation of START switch 120 initiates ONE SHOT multivibrator 123 which produces an output signal at its output 124 that is fed through line 125 as a master RESET signal. The master RESET signal appearing on line 125 will reset all of the flip-flops and counters to an initial START position. One example is shown by the master RESET signal being fed to the input 126 of OR gate 127 which in turn is differentiated in the output through differentiator 132 and is fed to the SET input 146 of CUE flip-flop 147 causing flip-flop 147 to move to its "1" state. At the same time, the output from differentiator 132 is fed through input 134 of OR gate 135 to initiate ONE SHOT multivibrator 141. The output from ONE SHOT multivibrator 141 causes the projector 144 to increment to its first slide. At the same time, the output of OR gate 135 is fed to the RESET input 154 of COUNTER 155 causing COUNTER 55 to return to a "0" count.

Projector 144 represents any suitable type of presentation device and could just as easily be a cathode ray tube display. However, for purposes of discussion, projector 144 will be a slide projector of the carousel type. Each of the slides in the carousel of projector 144 has a suitable binary code along the bottom portion thereof. The binary code may be formed in any suitable means, for example, can be impressed by means of magnetic ink, by suitable grooves to be mechanically read, or by means of holes through which the projector light shines. In the present case, the binary code is shown in the form of a series of holes, with the projector light being decoded by means of suitable photocells shown as 180 through 183. The slides in the carousel of projector 144 are inserted in the carousel in a proper program, in other words, in a proper order so that the instructor can display the information in a proper sequence. As explained previously, in a natural learning sequence of the machine, the first of each pair of slides will represent a cue slide which will instruct the student what to look for or what to expect on the next subsequent slide, or information slide. Only the information slides contain a binary code which is decoded by means of the photocells 180 through 183 and the decoder 193. When the first cue slide is presented on the screen to the operation of START switch 120 and the advance of the carousel by the output of ONE SHOT multivibrator 142, the COUNTER 155 (which as explained was set to "0" by operation of the START switch 120) will begin to count output pulses from the PULSE generator 163. PULSE generator 163 produces pulses at a rate of 1 per second. The THUMBWHEEL switches 164 and and 166 are preset by the instructor to determine the amount of time that a cue slide and an information slide will be presented on the reviewing screen. THUMBWHEEL switch 164 sets the time for the cue slide, which is normally in the neighborhood of one second. Similarly, THUMBWHEEL switch 166 sets the amount of time that the information slide is on the screen, which is normally in the area of 2 seconds. When the COUNT and COUNTER 155 equals the setting of THUMBWHEEL switch 164, an output will be produced at output 165 of THUMBWHEEL 166 which in turn is fed to the RESET input 150 of CUE flip-flop 147 causing CUE flip-flop 147 to return to its "0" state. When flip-flop 147 returns to its "0" state, a positive signal appears at its "0" output 151 which is, in turn, differentiated by differentiator 152 and fed through OR gate 135 to again activate ONE SHOT multivibrator 141. As explained previously, the output from ONE SHOT multivibrator 141 is fed to the input 143 of projector 144 causing the projector carousel to move to its next subsequent, or information, slide. The information slide can be either of two types, either a target slide which means that the information shown on the information slide will be the same as the information shown on the cue slide, or it can be a catch slide in which case the material on the information slide will be different from that on the cue slide. Each information slide is properly coded by means of the binary signal to indicate whether it is a target slide or a catch slide. Assume that the information slide is a target slide, in particular a TARGET 1 slide then, the decoder 193 will produce a signal at its output 196 which will be fed through conductor 207 to the input 202 of OR gate 201. This signal will pass through OR gate 201 to the SET input 213 of flip-flop 214 causing flip-flop 214 to change to its "1" state. When flip-flop 214 is at "1" state, an output signal appears at 216, which is fed to input 220 of AND gate 221. At the same time, since RESPONSE flip-flop 232 is in its "0" state because of the operation of START switch 120, a signal will appear at input 226 of AND gate 221. AND gate 221 is therefore enabled so that the 1 Khz pulses appearing at the output of the divide by 100 network 276 and on conductor 281 will be fed through AND gate 221 and counted in LATENCY COUNTER 237. If the information slide being displayed on the presentation screen is a TARGET slide, the student has been instructed to press RESPONSE switch 230. Operation of RESPONSE switch 230 will apply a positive signal to the input 228 of AND gate 224. Since AND gate 224 has been enabled by the "1" output of flip-flop 214 through conductor 222, operation of RESPONSE switch 230 will produce a signal at the output 229 of AND gate 224 which will be fed to the SET input 231 of the RESPONSE flip-flop 232 which will cause RESPONSE flip-flop 232 to move to its "1" state. When RESPONSE flip-flop 232 is in its "1" state, an output signal will appear at its output 235 which will be fed through conductor 250 to the input 251 of AND gate 252. Since the information slide is a target slide, the signal at the output 196 of decoder 193 will be conducted through conductor 282 and through OR gate 292 to the input 253 of AND gate 252. Therefore, AND gate 252 will be enabled so that the output from RESPONSE flip-flop 232 will be fed through AND gate 252 to enable ONE SHOT multivibrator 315. Upon being enabled, ONE SHOT multivibrator 315 produces an output signal which will light the green CORRECT ANSWER light 317, thereby indicating to the student that he has correctly answered the question.

The "1" output at 235 of RESPONSE flip-flop 232 is also coupled through conductor 250 to the inputs 467, 469, 473 and 475 of AND gates 462, 463, 464 and 465, respectively. The other inputs 466, 468, 472 and 474 of AND gates 462 through 465 are respectively connected to the CATCH 2, CATCH 1, TARGET 2 or TARGET 1 outputs of decoder 193. Since the particular information slide is a TARGET 1 slide, input 474 of AND gate 465 will be enabled and the RESPONSE signal at input 475 will produce an output signal which is fed to input 419 of COUNTER 415, thereby counting the correct response of the student.

At the same time, the "1" output at 235 of RESPONSE flip-flop 232 is fed to input 246 of AND gate 244. Since the LATENCY COUNTER has been counting the pulses from the output of the divide-by-100 network 276, as previously explained, LATENCY COUNTER will not be in its "0" state and, therefore, the "0" output 238 of LATENCY COUNTER will be at a low or binary "0" state. However, the output 238 of LATENCY COUNTER 237 is inverted by inverter 242, thereby applying a binary "1" signal to input 243 of AND gate 244. The output from RESPONSE flip-flop 232 and the inverted output from output 238 of LATENCY COUNTER 237 thereby enables AND gate 244, so that the 100 Khz output signals at 273 of oscillator 274 are fed through conductors 275 and AND gate 244 to the input 287 of AND gate 285. Since the information slide is a TARGET 1 slide, the output from 196 of decoder 193 will be fed through conductor 282 and conductor 283 to the input 284 of AND gate 285. Also, the output from 11 or greater output 423 of COUNTER 414 is inverted in inverter 426 and fed through conductor 427 to the input 286 of AND gate 285. Since COUNTER 415 has no count in it at the present time, the signal at output 423 of COUNTER 415 will be a low or binary "0" output which in turn will be inverted to a binary "1" through inverter 426 and will appear as such at input 286 of AND gate 285. AND gate 285 is therefore enabled and 100 Khz signals appearing at the output of AND gate 244 are fed through AND gate 285 and are counted in ACCUMULATOR 321. At the same time, the 100 Khz output signals from AND gate 244 are fed to the COUNTDOWN input 239 of LATENCY COUNTER 237 causing the LATENCY COUNTER to countdown to its "0" state. When LATENCY COUNTER 237 reaches a "0" state, a positive or binary "1" signal will appear at its output 238 which in turn will be inverted by inverter 242 and fed to input 243 of AND gate 244, thereby shutting off AND gate 244. It can be seen that in this way, the count that was previously in LATENCY COUNTER 237 has been transferred to ACCUMULATOR 321 which represents the accumulator for TARGET 1 information slides.

As mentioned previously, RESPONSE flip-flop 232 is in its "1" state and the output signal at output 235 is therefore fed through conductor 250 and 255 to the input 256 of AND gate 257. Since, as mentioned, the information slide in this instance is a TARGET 1 slide, the CATCH 1 output 198 and the CATCH 2 output 199 of decoder 193 will be in a binary "0" state and these signals in turn will be inverted by inverters 264 and 266 into binary "1" signals at the inputs 258 and 259, respectively, of AND gate 257. Therefore, AND gate 257 is enabled and an output signal appears at its output 260 which in turn is fed through OR gate 173 to the RESET input 215 of flip-flop 214, causing flip-flop 214 to return to its "0" state. Obviously, the timing requirement for flip-flop 214 must be such that it will not return to its "0" state until the count in LATENCY COUNTER has been transferred to ACCUMULATOR 1 through the action of the high frequency oscillator 274.

When flip-flop 214 returns to its "0" state, an output signal appears at its output 217 which is fed through OR gate 127 and is differentiated in differentiator 132. This differentiator signal is carried by conductor 133 through OR gate 135 to initiate ONE SHOT multivibrator 141 which, as explained, causes the projector carousel to move one slide, and in turn is fed to input 154 of COUNTER 155 causing COUNTER 154 to return to a "0" count. In addition, the differentiated signal output from differentiator 132 is fed through conductor 133 and conductor 145 to the SET input 146 of CUE flip-flop 147, causing CUE flip-flop 147 to return to its "1" state.

In the event that the student does not depress RESPONSE switch 230, the 1 second pulses from oscillator 163 will continue to be counted in COUNTER 155 until such time as the count of COUNTER 155 equals the thumbwheel setting of THUMBWHEEL switch 166. When the count in COUNTER 155, which as explained, may be in the order of 2 seconds, equals the setting of THUMBWHEEL switch 166, an output signal appears at output 167 which is coupled through conductor 171 and OR gate 173 to the RESET input 215 of flip-flop 214, thereby causing flip-flop 214 to return to its "0" state. After flip-flop 214 returns to its "0" state, the action of resetting COUNTER 155 and advancing the carousel projector 144 is the same as previously described.

It should be understood that there is disclosed in the present embodiment of the instant invention, a certain amount of redundancy circuitry. For example, there are shown two CATCH signal lines, two TARGET signal lines, two ACCUMULATORS as well as two CORRECT COUNTERS and two ERROR COUNTERS. The purpose for this redundancy circuitry is to allow the instructor to set up more than one CUE signal during a given operational cycle. It is to be understood that the invention is not limited to merely double redundancy but could also be extended to triple, or quadruple or even more redundancy. It should be further understood, that the operation of the redundant circuitry will be the same as that previously described. In other words, if the information slide were a TARGET 2 slide, the RESPONSE time would be counted in LATENCY COUNTER 237 exactly as described previously and would be transferred to ACCUMULATOR 323 for the TARGET 2 time accumulation in exactly the same way as that described for TARGET 1.

If the information slide had been a CATCH slide, in other words, if the information shown on the slide had been different from that shown on the CUE slide, the binary code from the slide wall will produce an output signal at output 198 of the decoder 193 which will in turn be coupled through conductor 209 to the input 204 of OR gate 201. The signal at the input 204 of OR gate 201 will be coupled through to its output 206 which in turn will be fed to the SET input 213 to flip-flop 214 causing the flip-flop 214 to change to its "1" state. When flip-flop 214 goes to its "1" state, the signal at output 216 is coupled through conductor 222 enabling the response AND gate 224. Since the INFORMATION slide is a CATCH slide, the student would not normally activate RESPONSE switch 230, and to do so would be an INCORRECT answer. However, in the event of such an incorrect response, the signal from source 121 through RESPONSE switch 230 would be transmitted through AND gate 224 to the SET input 231 of RESPONSE flip-flop 232 causing flip-flop 232 to switch to its "1" state. The output from response flip-flop 232 is coupled through conductor 250 to the input 304 of AND gate 305. At the same time, the CATCH 1 output 198 from decoder 193 is coupled through conductor 209 and conductor 263, and through OR gate 268 to the input 306 of AND gate 305. Since there are input signals at both the inputs 304, 306 of AND gate 305, the output 307 of AND gate 305 initiates ONE SHOT multivibrator 309 which in turn lights the red ERROR ANSWER light 311, indicating to the student that he has answered incorrectly.

A response signal from the output of flip-flop 232 caused by activation of RESPONSE switch 230, is also coupled through conductor 250 to the inputs 467, 469, 473 and 475 of AND gates 462, 463, 464 and 465 respectively. Each of the other inputs of AND gates 462 through 465 is connected to one of the TARGET or CATCH outputs from decoder 193. In the present example, since the INFORMATION slide is a CATCH 1 slide, the input 468 of AND gate 463 will be enabled so that the RESPONSE signal at input 469 will be coupled through AND gate 463 to its output 459 and in turn will be fed to the input 402 of ERROR COUNTER CATCH 1 401. In this manner, each incorrect answer to CATCH 1 INFORMATION slide is recorded.

After the RESPONSE switch has been activated by the student, the RESPONSE flip-flop will not immediately change back to its "0" state, even though the "1" output from flip-flop 232 is coupled through conductor 250 and 255 to input 256 of AND gate 257.

RESPONSE flip-flop 232 will be RESET to "0" in the manner previously described for the operation of a TARGET INFORMATION slide, namely, through the differentiation of the "0" output at 238 from LATENCY COUNTER 237, upon LATENCY COUNTER being counted down to "0." However, flip-flop 214 will not be RESET, even though the "1" output at 235 of RESPONSE flip-flop 232 is coupled through conductor 250 and conductor 255 to the input 256 of AND gate 257 as previously described. The reason why flip-flop 214 will not be RESET upon operation of RESPONSE switch 230 is that the CATCH 1 output 198 from decoder 193 is inverted in inverter 264 and is fed to input 258 of AND gate 257, thereby inhibiting AND gate 257. Flip-flop 214 will not be reset until the count of 1 second pulses in COUNTER 255 equals the setting of THUMBWHEEL switch 166, at which time the output at 167 of THUMBWHEEL switch 166 is fed through conductor 171 and OR gate 173 to the RESET input 215 of flip-flop 214, thereby resetting flip-flop 214. When flip-flop 214 is reset, the projector 144 is advanced to the next slide in the manner previously described.

The presentation of the sequential pairs of a CUE slide followed by a TARGET information slide, or a CUE SLIDE followed by a CATCH information slide, will continue until the entire teaching sequence is completed. At this time, the last slide presented to the projector will be a blank slide containing a binary code such that it will produce an output signal at the STOP output 194 of decoder 193. This signal will be coupled through conductor 335 to the input 336 of AND gate 337 thereby enabling AND gate 337. Upon being enabled, AND gate 337 will pass the 20 Hz pulses from the output of divide-by-50 network 277 to the COUNTDOWN input 340 of the COUNTER READOUT control mechanism 341. These 20 Hz pulses will be fed to the inputs 395, 400, 404–405 and 411–412 of COUNTERS 396, 401, 408 and 415, respectively. The 20 Hz pulses will count each of the COUNTERS back to "0" at which time output pulses will appear at the "0" output terminals 398, 403, 409–410 and 416–417 of COUNTERS 395, 401, 408 and 413, respectively.

At the same time that the COUNTDOWN pulses are counting COUNTERS 396, 401, 408 and 413 back to "0," the pulses are also being fed to inputs 361 through 366 of AND gates 367 through 372, respectively. Each of the COUNTERS 396, 401, 408 and 413, which are not at "0," will be producing a "0" output at its "0" output terminal which will be inverted by inverters 430 through 435, and fed to inputs 473 through 478 of AND gates 367 through 372. Each of the AND gates 367 through 372 which are associated with a COUNTER not in its "0" state will be enabled and the 20 Hz COUNTDOWN pulese will be fed through the respective AND gates 367 through 372 to their respective outputs 347 through 352. The outputs 347 through 352, as explained previously, are connected to a printer, and each output controls the position of a PRINT wheel. For example, each output pulse at output 347 of AND gate 367 will now cause its associated PRINT wheel to increment by one count. Therefore, if COUNTER 396 had a count of "3" stored therein, when this COUNTER is counted back to "0," three pulses will be fed through AND gate 367 which will in turn cause the associated PRINT wheel to increment to a count of "3."

The 20 Hz countdown pulses are further coupled from the output 347 of COUNTER READOUT control 341 to the COUNTDOWN input 490 of ACCUMULATOR READOUT control 485. The circuitry of ACCUMULATOR READOUT control 485 is substantially the same as that shown for COUNTER READOUT control 341 and, therefore, is not shown in detail. One difference between ACCUMULATOR READOUT control 485 and COUNTER READOUT control 341 is that each ACCUMULATOR 321 and 323 has three decade stages which are read, while the largest counter in the COUNTER READOUT control 341 are COUNT- ERS 408 and 413 which are two decade stages. However, the differences are merely that of additional stages and no difference in theory of operation.

Outputs 497 through 502 of ACCUMULATOR READOUT control 485 are connected to the PRINT wheels of the output PRINTER (not shown) in a manner similar to that previously explained with respect to the outputs 347 through 352 of COUNTER READOUT control 341.

When both ACCUMULATORS 321 and 323 have been returned to "0," output signals will appear at outputs 491 through 496 of ACCUMULATOR READOUT control 485 which in turn will be coupled to inputs 451 through 456 of AND gate 450. At this time, AND gate 450 will produce an output signal 457 which is the PRINT COMMAND signal which is coupled to the printer causing the printer to print the information set into each of its PRINT wheels. After the printer is printed, the entire circuitry awaits a new command to start a new teaching cycle, which command is given by again depressing the START switch 120.

It will, of course, be understood that various changes may be made in the form, details, arrangement and proportion of the parts without departing from the scope of the invention, which generally stated, consists in the matter set forth in the accompanying claims.

What is claimed is:

1. The method of simultaneously teaching and testing a student, comprising the following steps:
   a. automatically presenting to a student by means of a programmed presentation machine a sequence of symbols including first presenting a cue symbol, then presenting target symbols (related to the cue symbol) or catch symbols (not related to the cue symbol),
   b. producing a start signal for each symbol presented,
   c. producing a response signal responsive to the student's operation of a response indicating device subsequent to viewing the presented target or catch symbols and prior to the presenting of the next cue symbol,
   d. automatically recording the response signals of the student to said target or catch symbols,
   e. determining the time intervals between the target start signal and the target response signal,
   f. finally, displaying the cumulative response measures of the student to the target symbols and the catch symbols as well as the average time interval for target responses.

2. The method set forth in claim 1 wherein the steps include:
   a. producing said start signal by means of an automatic analyzing machine,
   b. producing said response signal by means of a student operated switch in said analyzing machine when the student reacts positively to a presented symbol,
   c. determining in said analyzing machine after each actuation of the switch whether the switch was actuated in response to a target symbol or a catch symbol, and
   d. immediately indicating to the student the correctness of each response.

3. The method of claim 1 and the further step of indicating to the student immediately after each response whether or not his response was correct.

4. The method of claim 1 wherein a plurality of different cue symbols are presented to the student during a single test sequence.

5. The method of claim 1 wherein said step of presenting symbols to the student occurs at regular time intervals to establish a rhythmic thought pattern for the student.

6. The method of claim 1 wherein a cue symbol is presented to the student immediately after a correct response by the student.

7. Apparatus for simultaneously teaching and testing a student, comprising:
   a. means for presenting to a student a sequence of symbols including first presenting a cue symbol, then presenting target symbols or catch symbols,
   b. means for producing a start signal for each symbol presented,
   c. means for producing a response signal responsive to the student's operation of a response indicating device upon presentation of a target or a catch symbols,
   d. means connected to receive said response signals and for automatically recording the responses of the student to said target or catch symbols,
   e. means connected to receive said start signals and said response signals and to determine the time intervals between the target start signal and the target response signal, and
   f. means connected to receive and display the cumulative response measures of the student to the target symbols and the catch symbols as well as the average time interval for target responses.

8. The apparatus of claim 7 wherein said student operated signal generating means is a single throw switch.

9. The apparatus of claim 7 wherein said means for determining time intervals includes a means for determining the student's average response time for correct responses.

10. The apparatus of claim 7 wherein:
    a. means are connected to said means for determining time intervals for determining the student's average response time for correct responses,
    b. means are connected to receive said response signals to determine the number of the student's correct responses, and to determine the number of the student's incorrect responses, and
    c. means are connected for displaying the average response time for correct responses and said correct and incorrect responses.

11. The apparatus of claim 7 which includes means for recording and displaying separately the student's performance on the test items presented with a plurality of different cue items.

12. The apparatus of claim 7 and means for indicating to the student after each response whether or not his response was correct or incorrect.

* * * * *